(12) United States Patent
Park (10) Patent No.: US 11,312,349 B2
(45) Date of Patent: Apr. 26, 2022

(54) ELECTRIC BRAKE DEVICE

(71) Applicant: HYUNDAI MOBIS Co., Ltd., Seoul (KR)

(72) Inventor: Se Won Park, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 105 days.

(21) Appl. No.: 16/838,949

(22) Filed: Apr. 2, 2020

(65) Prior Publication Data

US 2020/0331445 A1 Oct. 22, 2020

(30) Foreign Application Priority Data

Apr. 18, 2019 (KR) .................. 10-2019-0045332

(51) Int. Cl.
*B60T 8/40* (2006.01)
*B60T 13/74* (2006.01)
*B60T 7/04* (2006.01)

(52) U.S. Cl.
CPC ............ *B60T 13/745* (2013.01); *B60T 7/042* (2013.01); *B60T 8/409* (2013.01)

(58) Field of Classification Search
CPC ...... B60T 8/4081; B60T 8/4086; B60T 8/409; B60T 11/20; F15B 7/08; F15B 15/24; F15B 15/222; F15B 15/226
See application file for complete search history.

(56) References Cited

U.S. PATENT DOCUMENTS

| 6,233,932 B1 | 5/2001 | Heibel et al. | |
| 6,347,518 B1* | 2/2002 | Kingston | B60T 7/042 60/552 |
| 6,464,307 B1* | 10/2002 | Yoshino | B60T 7/042 303/11 |
| 6,698,202 B2 | 3/2004 | Ogiwara et al. | |
| 2002/0084690 A1* | 7/2002 | Zehnder, II | B60T 11/20 303/3 |
| 2004/0181381 A1* | 9/2004 | Matsuhashi | B60T 8/4081 703/7 |
| 2006/0048512 A1 | 3/2006 | Ohlig et al. | |
| 2010/0283315 A1 | 11/2010 | Isono | |
| 2014/0292065 A1* | 10/2014 | Jeon | B60T 8/4086 303/10 |

(Continued)

FOREIGN PATENT DOCUMENTS

| DE | 3924085 | 1/1991 |
| DE | 19736646 | 3/1999 |

(Continued)

OTHER PUBLICATIONS

Machine translation of DE 102011117264, retrieved Sep. 10, 2021 (Year: 2021).*

*Primary Examiner* — Bradley T King (74) *Attorney, Agent, or Firm* — H.C. Park & Associates, PLC (57) ABSTRACT

An electric brake device that including a pedal, a master cylinder unit including a cylinder storing hydraulic pressure therein, and a piston moved according to a pedal force of the pedal to generate the hydraulic pressure and provide a restoring force, and a pedal force adjustment unit operatively connected to the master cylinder unit to adjust the pedal force of the pedal by the hydraulic pressure, which is capable of adjusting a brake pedal feel.

9 Claims, 5 Drawing Sheets

(56) References Cited

U.S. PATENT DOCUMENTS

| | | | | |
|---|---|---|---|---|
| 2016/0031424 A1* | 2/2016 | Weh | ................. | B60T 8/409 60/533 |
| 2016/0160892 A1* | 6/2016 | Schepp | ............... | F15B 15/1428 92/85 A |
| 2017/0334416 A1* | 11/2017 | Ryu | ................. | B60T 8/409 |
| 2018/0201247 A1* | 7/2018 | Koshimizu | ............. | B60T 11/20 |

FOREIGN PATENT DOCUMENTS

| | | | | |
|---|---|---|---|---|
| DE | 10311060 | | 10/2004 | |
| DE | 102011117264 A1 * | | 11/2012 | ............ B60T 13/662 |
| DE | 102013110188 | | 3/2015 | |
| KR | 10-0495757 | | 6/2005 | |
| KR | 10-0759882 | | 9/2007 | |
| KR | 10-2013-0139696 | | 12/2013 | |
| KR | 10-2018-0007789 | | 1/2018 | |

* cited by examiner

ELECTRIC BRAKE DEVICE

CROSS-REFERENCE TO RELATED APPLICATION

This application claims priority from and the benefit of Korean Patent Application No. 10-2019-0045332, filed on Apr. 18, 2019, which is hereby incorporated by reference for all purposes as if fully set forth herein.

BACKGROUND

Field

Exemplary embodiments of the invention relate generally to an electric brake device and, more specifically, to an electric brake device capable of adjusting a pedal force as necessary while providing a brake pedal feel.

Discussion of the Background

In general, a vehicle is essentially equipped with a brake system for braking, which includes a separate hydraulic pedal feel simulator installed therein to provide a pedal feel for a driver during braking.

The pedal feel simulator is connected to a master cylinder so that it is pressed by the hydraulic pressure according to the pedal force of a brake pedal to provide a repulsive force to the brake pedal. In this case, the pedal feel simulator uses a plurality of springs and a plurality of rubber dampers to provide a reaction force similar to the pedal simulator of a conventional brake system (CBS).

However, some drivers may not calibrate the pedal force because the pedal force is conventionally fixed at the time of initial design. Therefore, it is necessary to improve this issue.

The related art of the present invention is disclosed in Korean Patent Application Publication No. 2018-0007789 (published on Jan. 24, 2018, entitled "Pedal Feel Simulator").

The above information disclosed in this Background section is only for understanding of the background of the inventive concepts, and, therefore, it may contain information that does not constitute prior art.

SUMMARY

Various embodiments are directed to an electric brake device capable of adjusting a pedal force as necessary while providing a brake pedal feel.

Additional features of the inventive concepts will be set forth in the description which follows, and in part will be apparent from the description, or may be learned by practice of the inventive concepts.

In an embodiment, there provided an electric brake device that includes a pedal, a master cylinder unit including a cylinder storing hydraulic pressure therein, and a piston moved according to a pedal force of the pedal to generate the hydraulic pressure and provide a restoring force, and a pedal force adjustment unit operatively connected to the master cylinder unit to adjust the pedal force of the pedal by the hydraulic pressure.

The pedal force adjustment unit may include an adjustment cylinder section communicating with the cylinder, an adjustment fixing section fixedly installed to an end of the adjustment cylinder section, an adjustment damper section supported by the adjustment fixing section and adjusting the hydraulic pressure, and an adjusting moving section supported by the adjustment damper section and operatively connected to the piston.

The adjustment fixing section may include a fixing support supported at the end of the adjustment cylinder section, and a fixing insert extending from the fixing support to be inserted into the adjustment moving section.

The adjustment damper section may include a damper insert inserted into the adjustment moving section and having a damper storage formed to store a fluid therein, a damper tube coupled to the damper insert to communicate with the damper storage, and passing through the adjustment fixing section to guide the fluid, and a damper cap configured to be attachable to and detachable from an end of the damper tube and to open and close the damper tube.

The damper insert may be shaped to have an outer diameter decreasing from one end thereof to the other end thereof, and the damper storage may be formed to extend in a longitudinal direction of the damper insert from the center of the other end of the damper insert, for storing the fluid therein.

The damper tube may be made of a metal material, and the damper insert may be made of an elastic material.

The damper tube may be hot-pressed into the damper insert.

The adjustment damper section may further include a damper seal disposed between the adjustment fixing section and the damper tube to prevent a leakage of oil.

The adjustment moving section may include a moving plate supporting the piston, a moving tube extending from the moving plate so that the adjustment fixing section and the adjustment damper section are inserted into the moving tube, and a moving protrusion protruding from the moving plate to be inserted into the adjustment damper section.

The adjustment moving section may further include a moving latch extending outward from the moving tube, and a moving spring disposed between the moving latch and the adjustment fixing section to provide a restoring force to the moving latch.

As apparent from the above description, the electric brake device according to the present invention enables the driver to adjust the pedal force of the pedal and calibrate the changed pedal force of the pedal so as to suit him/her.

The electric brake device according to the present invention enables the driver to open and close the damper tube using the damper cap so that a fluid is injected into the damper insert through the damper tube.

The electric brake device according to the present invention can prevent a leakage of oil since the damper seal is disposed outside the damper tube.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
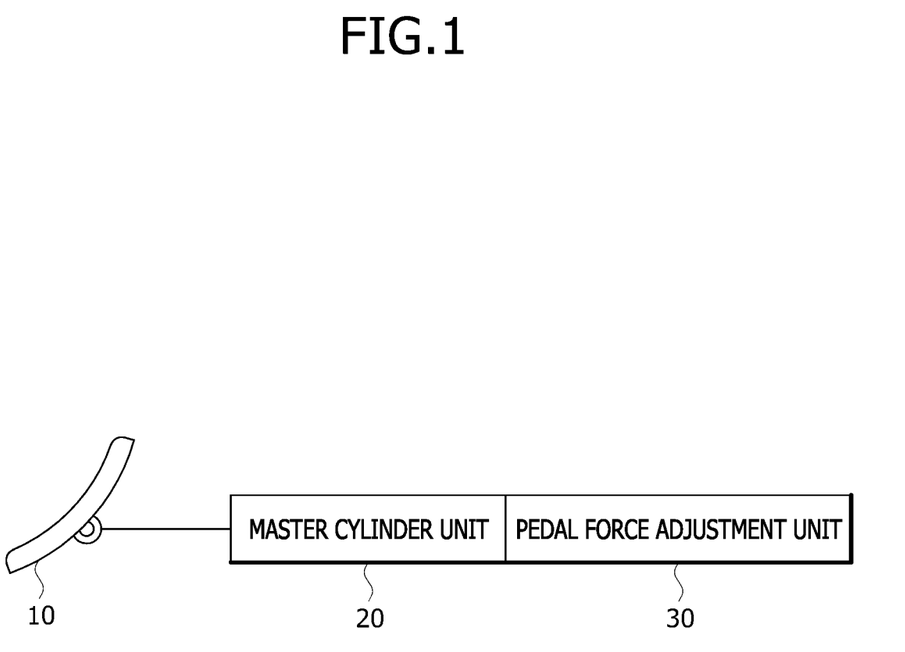
FIG. 1 is a view schematically illustrating an electric brake device according to an embodiment of the present invention.
Figure 2:
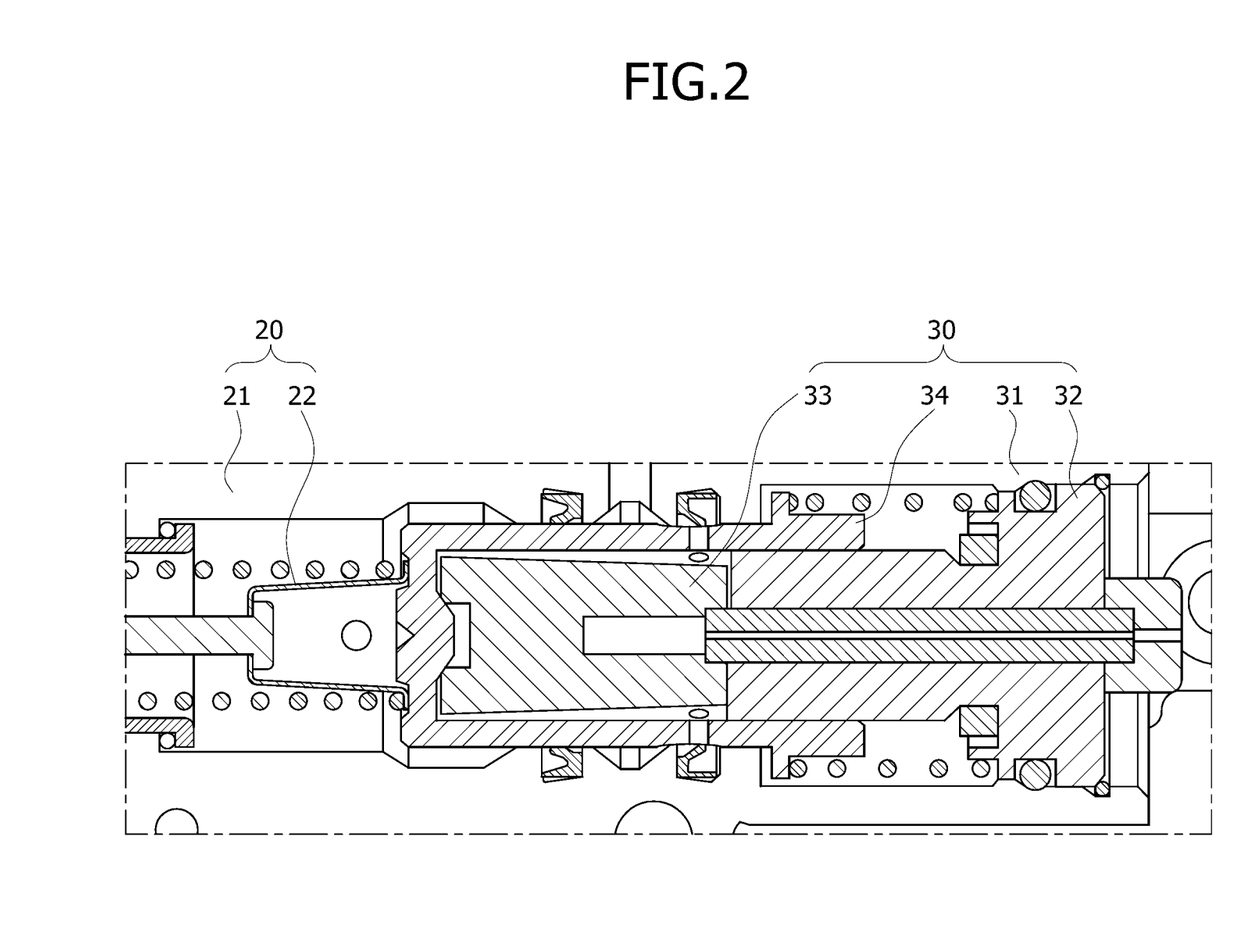
FIG. 2 is a view schematically illustrating a pedal force adjustment unit according to an embodiment of the present invention.

FIG. 1 is a view schematically illustrating an electric brake device according to an embodiment of the present invention. FIG. 2 is a view schematically illustrating a pedal force adjustment unit according to the embodiment of the present invention. Referring to FIGS. 1 and 2, the electric brake device, which is designated by reference numeral 1, according to the embodiment of the present invention includes a pedal 10, a master cylinder unit 20, and a pedal force adjustment unit 30.

The pedal 10 is an object that is pressed by a driver's foot. When braking is required to decelerate or stop a vehicle while the vehicle is traveling, the driver may press the pedal 10.

The master cylinder unit 20 includes a cylinder 21 storing hydraulic pressure therein, and a piston 22 moved according to the pedal force of the pedal 10 to generate the hydraulic pressure and provide a restoring force. For example, when the pedal 10 is pressed in a normal state in the electric brake device 1, hydraulic pressure may be supplied to a wheel cylinder by driving an electric motor. On the other hand, when the pedal 10 is pressed in an abnormal state, the hydraulic pressure of the master cylinder unit 20 may be supplied to the wheel cylinder.

The pedal force adjustment unit 30 may be operatively connected to the master cylinder unit 20 to adjust the pedal force of the pedal 10 by the hydraulic pressure. For example, the pedal force adjustment unit 30 may be disposed at the end of the master cylinder unit 20 to adjust the pedal force of the pedal 10 by adjusting oil pressure or air pressure according to the personal preference of the driver.

The pedal force adjustment unit 30 according to the embodiment of the present invention includes an adjustment cylinder section 31, an adjustment fixing section 32, an adjustment damper section 33, and an adjustment moving section 34.

The adjustment cylinder section 31 communicates with the cylinder 21. For example, the adjustment cylinder section 31 may be formed integrally with the cylinder 21, and may have a shape in which the right end thereof is closed when the left end thereof communicates with the cylinder 21. More specifically, the cylinder 21 may have a tubular shape in which both ends thereof are closed, and the right end of the cylinder 21 may be limited to the adjustment cylinder section 31.

The adjustment fixing section 32 is fixedly installed to the end of the adjustment cylinder section 31. For example, the adjustment fixing section 32 may be fixedly installed to the inner side of the right end of the adjustment cylinder section 31 to support the adjustment damper section 33.

The adjustment damper section 33 is supported by the adjustment fixing section 32, and may adjust the hydraulic pressure. For example, the adjustment damper section 33 enables a user to inject a desired amount of liquid or gas to adjust the pedal force of the pedal 10 according to the injected amount of fluid.

The adjusting moving section 34 is supported by the adjustment damper section 33 and operatively connected to the piston 22. For example, the adjustment moving section 34 may return to its original position by the adjustment damper section 33 or its own restoring force when the pressure of the pedal 10 is released.

Figure 3:
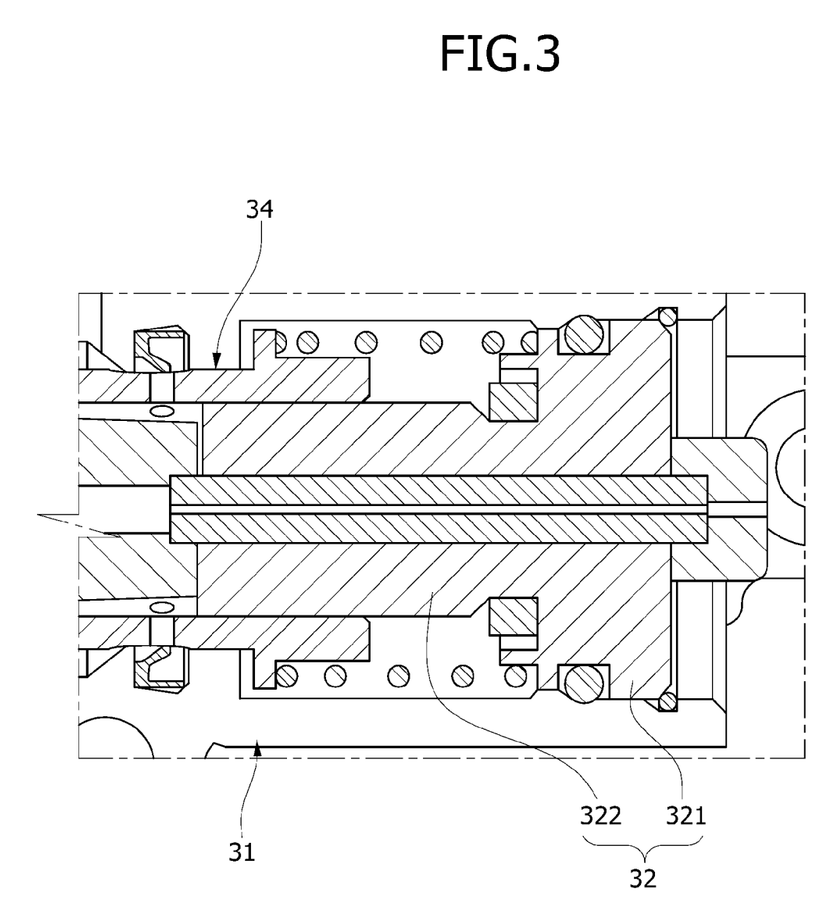
FIG. 3 is a view schematically illustrating an adjustment fixing section according to an embodiment of the present invention.

FIG. 3 is a view schematically illustrating the adjustment fixing section according to the embodiment of the present invention. Referring to FIG. 3, the adjustment fixing section 32 according to the embodiment of the present invention includes a fixing support 321 and a fixing insert 322.

The fixing support 321 is supported at the end of the adjustment cylinder section 31. For example, the fixing support 321 may be fixedly installed to the inner side of the right end of the adjustment cylinder section 31.

The fixing insert 322 extends toward the piston 22 from the fixing support 321 to be inserted into the adjustment moving section 34. For example, the fixing insert 322 may have an outer diameter smaller than the fixing support 321.

Figure 4:
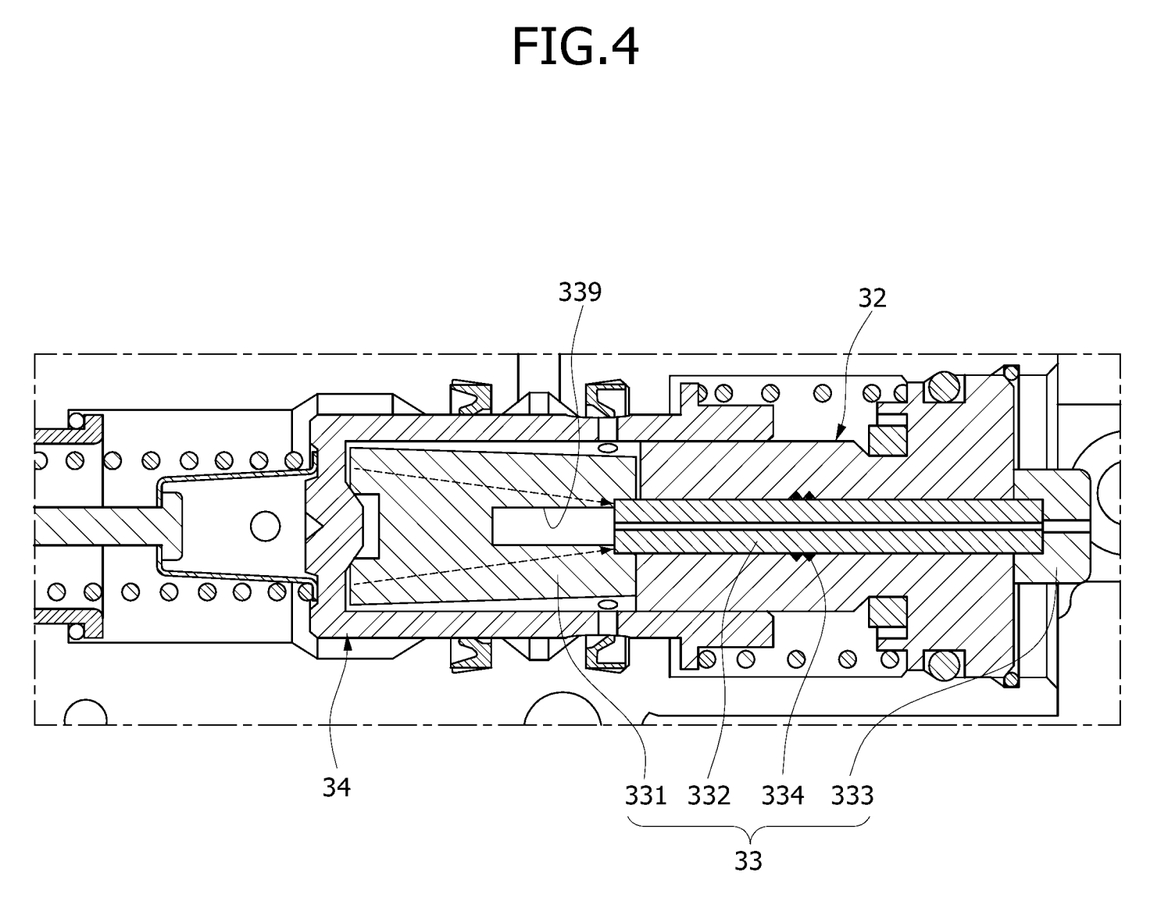
FIG. 4 is a view schematically illustrating an adjustment damper section according to an embodiment of the present invention.

FIG. 4 is a view schematically illustrating the adjustment damper section according to the embodiment of the present invention. Referring to FIG. 4, the adjustment damper section 33 according to the embodiment of the present invention includes a damper insert 331, a damper tube 332, and a damper cap 333.

The damper insert 331 is inserted into the adjustment moving section 34, and has a damper storage 339 formed to store a fluid therein. For example, the left end of the damper insert 331 may be latched to the inner wall of the adjustment moving section 34, and the right end of the damper insert 331 may abut on the adjustment fixing section 32.

The damper tube 332 is coupled to the damper insert 331 to communicate with the damper storage 339, and passes through the adjustment fixing section 32 to guide the fluid. For example, the damper tube 332 may pass through the adjustment fixing section 32 and the adjustment cylinder section 31. The damper tube 332 may be operatively connected to the damper insert 331. The end of the damper tube 332 may correspond to a structure for injecting air into a bicycle tire or a vehicle tire.

The damper cap 333 is attachable to and detachable from the end of the damper tube 332 and opens and closes the damper tube 332. For example, the damper cap 333 may be disposed outside the adjustment cylinder section 31 and may be screwed to the outer peripheral surface of the damper tube 332 exposed to the outside.

The damper insert 331 is shaped to have an outer diameter decreasing from one end thereof to the other end thereof, and the damper storage 339 is formed to extend in the longitudinal direction of the damper insert 331 from the center of the other end of the damper insert 331. Thus, when the left end of the damper insert 331 is pressed, a force may be transmitted to the center of the right end of the damper insert 331 so that the coupling of the damper tube 332 to the damper storage 339 is kept stable.

The damper tube 332 is made of a metal material, and the damper insert 331 is made of an elastic material. More specifically, the damper insert 331 may be made of a deformable rubber material.

Meanwhile, the damper tube 332 is hot-pressed into the damper insert 331. For example, the end of the damper tube 332 is heated to 300 degrees Celsius to be pressed into the damper storage 339, and the inner and outer diameters of the damper insert 331 into which the damper tube 332 is pressed may be deformed.

The adjustment damper section 33 according to the embodiment of the present invention may further include a damper seal 334. The damper seal 334 is disposed between the adjustment fixing section 32 and the damper tube 332 to prevent a leakage of oil. For example, the oil introduced into the adjustment moving section 34 may not leak to the outside by the damper seal 334.

Figure 5:
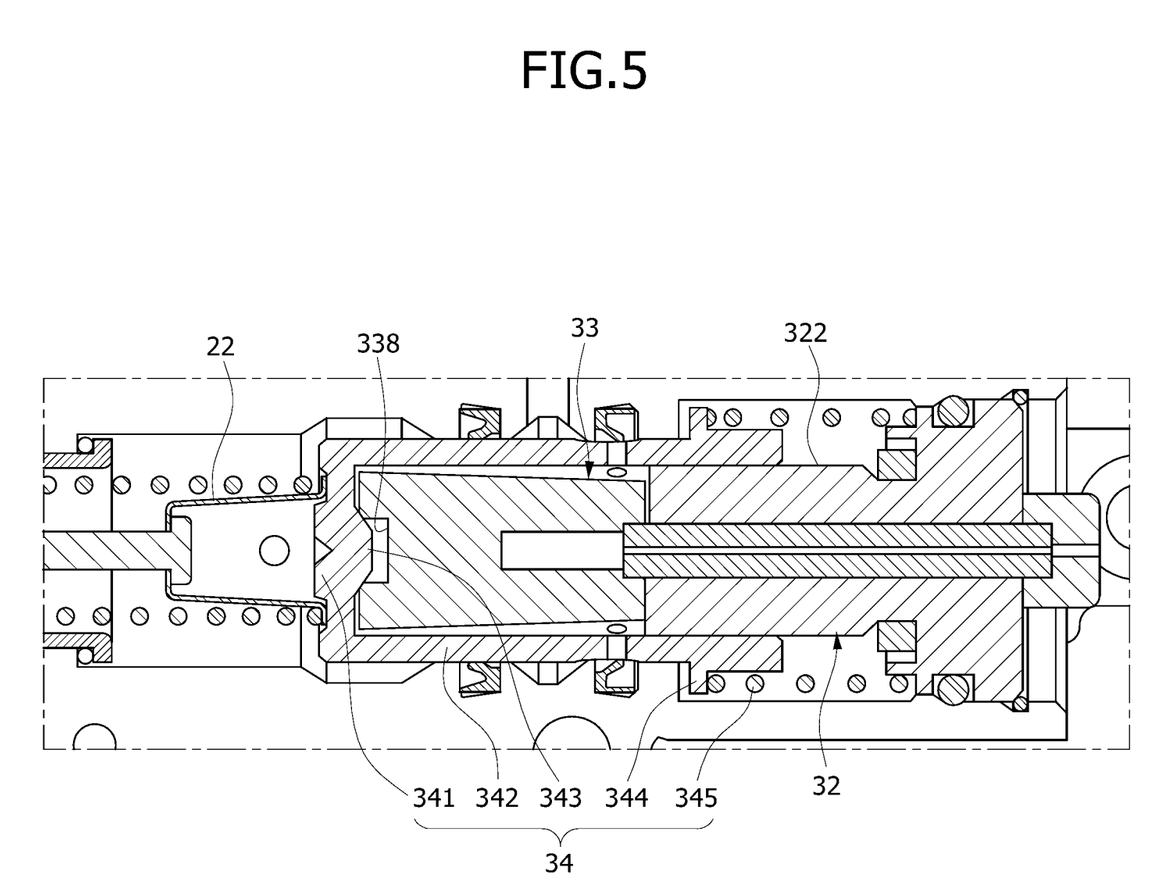
FIG. 5 is a view schematically illustrating an adjustment moving section according to an embodiment of the present invention.

FIG. 5 is a view schematically illustrating the adjustment moving section according to the embodiment of the present invention. Referring to FIG. 5, the adjustment moving section 34 according to the embodiment of the present invention includes a moving plate 341, a moving tube 342, and a moving protrusion 343.

The moving plate 341 supports the piston 22. For example, the moving plate 341 may be disposed between the piston 22 and the adjustment damper section 33 and may pressurize the adjustment damper section 33 while supporting the piston 22. The moving plate 341 may come into surface contact with or be coupled to the piston 22. The moving plate 341 may have a disc shape.

The moving tube 342 extends from the moving plate 341 so that the adjustment fixing section 32 and the adjustment damper section 33 are inserted into the moving tube 342. For example, the moving tube 342 may extend toward the adjustment fixing section 32 from the edge of the moving plate 341, and the entire adjustment damper section 33 and the fixing insert 322 may be inserted into the moving tube 342. In this case, the outer diameter of the fixing insert 322 corresponds to the inner diameter of the moving tube 342 so that the vertical movement of the moving tube 342 may be suppressed while the moving tube 342 is moving.

The moving protrusion 343 protrudes from the moving plate 341 to be inserted into the adjustment damper section 33. For example, the moving protrusion 343 may be disposed at the center of the moving plate 341 and may be inserted into a damper groove 338 formed in the left end of the damper insert 331. Thus, it is possible to suppress the vertical movement of the adjustment damper section 33 and to induce a pressing force to be transmitted in the longitudinal direction of the adjustment damper section 33, when the adjustment moving section 34 presses the adjustment damper section 33.

The adjustment moving section 34 according to the embodiment of the present invention may further include a moving flange 344 and a moving spring 345. The moving flange 344 extends outward from the moving tube 342, and the moving spring 345 is disposed between the moving flange 344 and the adjustment fixing section 32 to provide a restoring force to the moving flange 344. For example, the moving spring 345 may be a coil spring surrounding the moving tube 342 and may be supported by the fixing support 321.

The installation and operation of the electric brake device according to the embodiment of the present invention having the above structure will be described as follows.

The adjustment fixing section 32 is inserted into the adjustment cylinder section 31, and the damper tube 332 passing through the adjustment fixing section 32 is hot-pressed into the damper insert 331. In this case, the end of the damper tube 332 is opened and closed by the damper cap 333. Meanwhile, the adjustment moving section 34, which partially surrounds the damper insert 331 and the adjustment fixing section 32, is supported by the piston 22.

When the driver presses the pedal 10 in the above state, the piston 22 presses the adjustment damper section 33 to provide a pedal force.

Meanwhile, the driver can adjust the pedal force felt when pressing the pedal 10 by injecting liquid such as oil and gas such as air into the damper insert 331 in a desired amount.

That is, the driver exposes the damper tube 332 to the outside using the damper cap 333 and supplies an appropriate hydraulic pressure to the damper tube 332 using a fluid injector. Thus, a fluid is injected into the damper storage 339 through the damper tube 332 so that the reaction force of the adjustment damper section 33 itself is adjusted.

The electric brake device 1 according to the embodiment of the present invention enables the driver to adjust the pedal force of the pedal 10 and calibrate the changed pedal force of the pedal 10 so as to suit him/her.

The electric brake device 1 according to the embodiment of the present invention enables the driver to open and close the damper tube 332 using the damper cap 333 so that a fluid is injected into the damper insert 331 through the damper tube 332.

The electric brake device 1 according to the embodiment of the present invention can prevent a leakage of oil since the damper seal 334 is disposed outside the damper tube 332.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the invention should be defined by the appended claims.

What is claimed is:

1. An electric brake device comprising:
   a pedal;
   a master cylinder unit comprising a cylinder configured to store hydraulic pressure therein, and a piston configured to be moved according to a pedal force applied by the pedal to generate the hydraulic pressure and provide a restoring force; and
   a pedal force adjustment unit operatively connected to the master cylinder unit and configured to adjust the pedal force of the pedal by the hydraulic pressure,
   wherein:
   the pedal force adjustment unit comprises:
      an adjustment cylinder section communicating with the cylinder;
      an adjustment fixing section fixedly installed to an end of the adjustment cylinder section;
      an adjustment damper section supported by the adjustment fixing section and configured to adjust the hydraulic pressure by enabling a user to inject a desired amount of fluid to adjust the pedal force of the pedal according to the injected amount of fluid; and
      an adjusting moving section supported by the adjustment damper section and operatively connected to the piston.

2. The electric brake device according to claim 1, wherein the adjustment fixing section comprises:
   a fixing support supported at the end of the adjustment cylinder section; and
   a fixing insert extending from the fixing support and insertable into the adjustment moving section.

3. The electric brake device according to claim 1, wherein the adjustment damper section comprises:
   a damper insert inserted into the adjustment moving section and having a damper storage formed to store a fluid therein;
   a damper tube coupled to the damper insert to communicate with the damper storage, and passing through the adjustment fixing section to guide the fluid; and a damper cap attachable to and detachable from an end of the damper tube and to open and close the damper tube.

4. The electric brake device according to claim 3, wherein:

an outer diameter of the damper insert decreases from one end thereof to the other end thereof; and the damper storage extends in a longitudinal direction of the damper insert from the center of the other end of the damper insert, for storing the fluid therein.

5. The electric brake device according to claim 4, wherein:

the damper tube is made of a metal material; and the damper insert is made of an elastic material.

6. The electric brake device according to claim 5, wherein the damper tube is hot-pressed into the damper insert.

7. The electric brake device according to claim 3, wherein the adjustment damper section further comprises a damper seal disposed between the adjustment fixing section and the damper tube.

8. The electric brake device according to claim 1, wherein the adjustment moving section comprises:

a moving plate supporting the piston;

a moving tube extending from the moving plate such that the adjustment fixing section and the adjustment damper section are inserted into the moving tube; and a moving protrusion protruding from the moving plate and insertable into the adjustment damper section.

9. The electric brake device according to claim 8, wherein the adjustment moving section further comprises:

a moving flange extending outward from the moving tube; and a moving spring disposed between the moving flange and the adjustment fixing section and configured to provide a restoring force to the moving flange.

\* \* \* \* \*